Nov. 18, 1958  B. J. VINCENT  2,860,855
APPARATUS FOR BORING FISHING HOLES IN ICE
Filed July 26, 1956  2 Sheets-Sheet 1
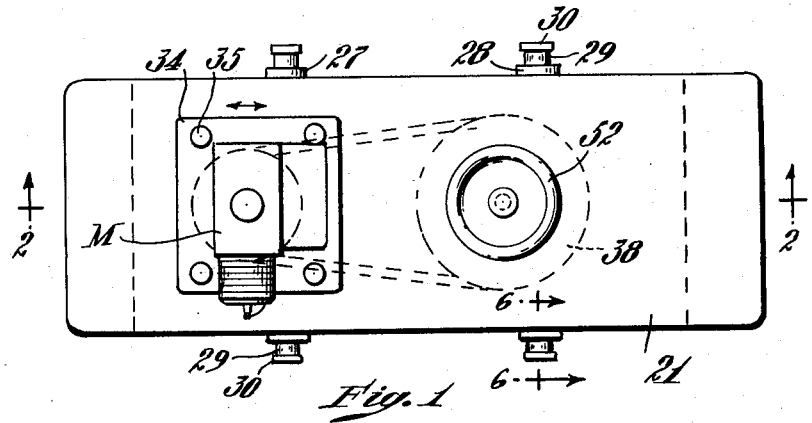
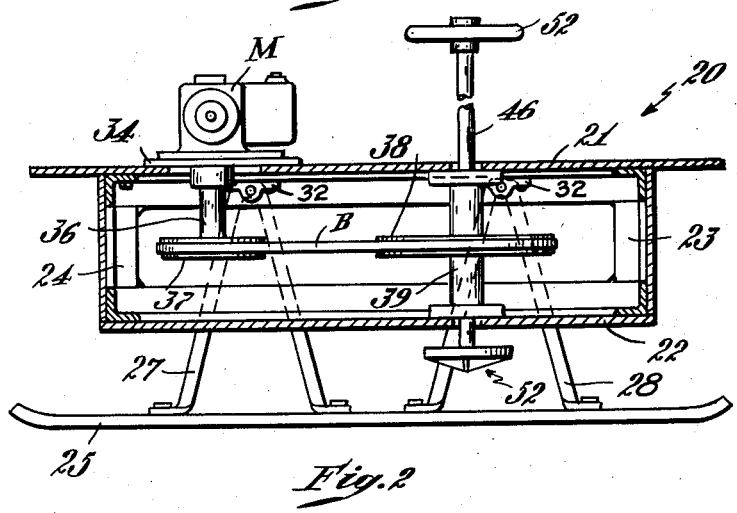
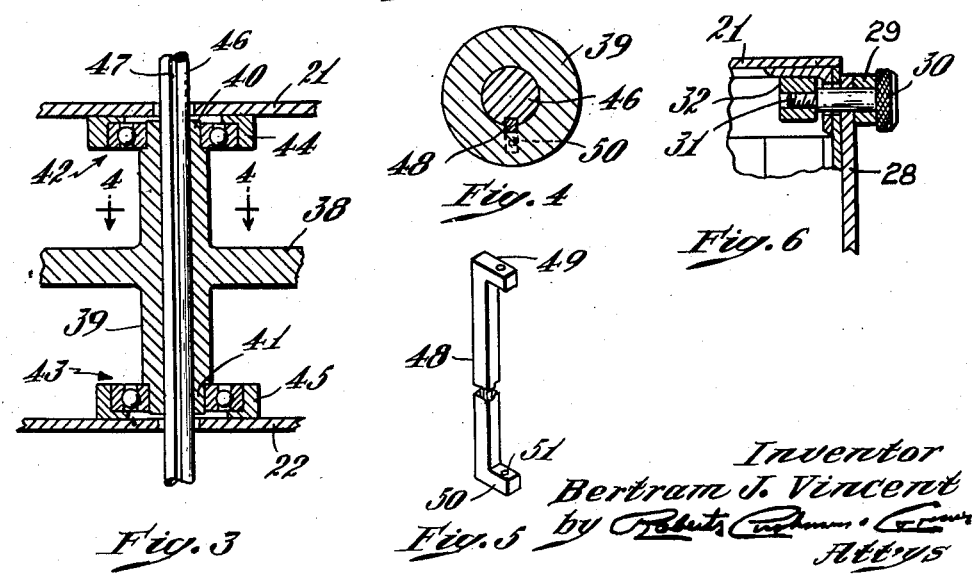
Inventor
Bertram J. Vincent Nov. 18, 1958     B. J. VINCENT     2,860,855
APPARATUS FOR BORING FISHING HOLES IN ICE Filed July 26, 1956     2 Sheets-Sheet 2

Inventor
Bertram J. Vincent
by Roberts Cushman & Grover
Attys

United States Patent Office 2,860,855
Patented Nov. 18, 1958

2,860,855
APPARATUS FOR BORING FISHING HOLES IN ICE

Bertram J. Vincent, Leominster, Mass.

Application July 26, 1956, Serial No. 600,189

1 Claim. (Cl. 255—61)

This invention pertains to apparatus for use in ice fishing and more particularly to improved means for cutting fishing holes in ice.

The primitive way of cutting ice fishing holes was by the use of an axe, but this method is laborious, time-consuming, and substantially impossible of performance when the ice is of substantial thickness. Ice cutting chisels have also been employed for the purpose, but though the chisel is superior to an axe, the hole made by the use of a chisel represents a great deal of wasted energy, and is usually much larger than is necessary or desirable. The use of an auger-like ice cutting tool has also been proposed, and tools of this type have been devised. Such tools represent an improvement, in theory at least, over the implements previously employed, but so far as is known to me, have not been generally adopted, possibly because as heretofore devised the design of the cutting edges employed has been such that the imuplement is not efficient, and further because such devices have usually been designed for manual operation.

The present invention has for an object the provision of apparatus for use in cutting ice-fishing holes, whereby holes of proper size may be cut without substantial waste of energy and through ice of any thickness such as may ordinarily be encountered on lakes or streams where fishing is customarily practiced. A further object is to provide ice cutting apparatus of readily portable type such as may be carried in the usual passenger automobile, but which, when set up for use, comprises supporting runners so that it may readily be pulled across ice or snow. A further object is to provide apparatus of the above type having an ice boring tool and motor means for driving it. A further object is to provide an ice boring tool of novel design having cutting edges so devised that they operate efficiently and with a minimum expenditure of energy and having guiding means whereby the tool is prevented from deflecting from its intended line of operation, even though the ice be of very substantial thickness, for instance from three to four feet deep, and although the tool is carried by a rotary shaft or stem whose only bearings are at a point above the surface of the ice. Other and further objects and advantages of the invention will be pointed out in the following more detailed description and by reference to the accompanying drawings, wherein Fig. 1 is a plan view of a preferred form of apparatus embodying the invention;

Fig. 2 is a vertical section partly in elevation, substantially on the line 2—2 of Fig. 1;

Fig. 3 is a fragmentary section, to larger scale than Fig. 2, and in substantially the same plane;

Fig. 4 is a section on line 4—4 of Fig. 3;

Fig. 5 is a perspective view of a desirable form of key which may be employed for connecting the drive pulley to the shaft;

Fig. 6 is a fragmentary section to larger scale, on the line 6—6 of Fig. 1;

Figure 7:
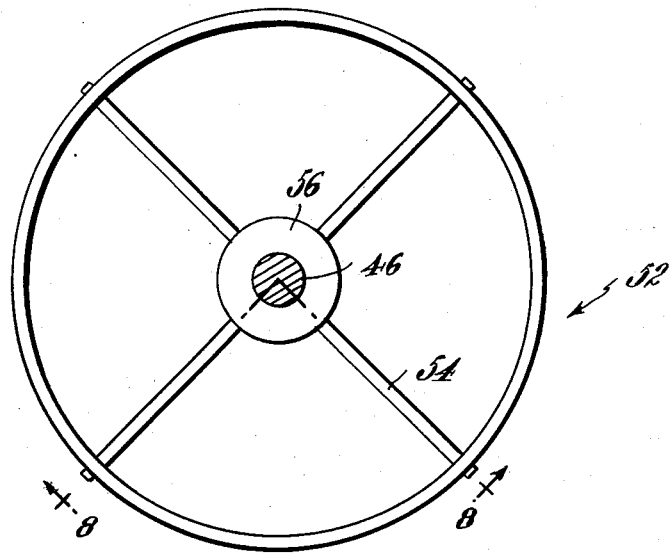
Fig. 7 is a plan view of the cutting tool, with its shaft shown in horizontal section.

Referring to the drawings, the numeral 20 indicates the apparatus as a whole, this apparatus comprising, as here illustrated, a sled having the upper horizontal member 21 and the lower horizontal member 22 spaced from the member 21 and united to the latter by the vertical members 23 and 24. This structure is mounted upon parallel runners 25 (only one of which is shown), each runner being provided with a pair of brackets 27 and 28, each of which comprising, as here illustrated, upwardly converging struts united at their upper ends to a sleeve member 29. Each sleeve member is designed to receive the body portion of a shoulder screw 30 having a screw-threaded shank 31, which, in use, has threaded engagement with a hole in the end of a bracket 32 secured to the underside of the member 21. Each shoulder screw has an enlarged head portion by means of which it may be turned manually, thereby making it readily possible to attach each of the ruuners to the super-structure to form the sled but permitting the runners to be detached from the super-structure to facilitate the storage of the sled parts in the trunk of an ordinary passenger automobile.

A motor carriage 34 is mounted on the upper surface of the member 21 near one end of the latter, the motor carriage having elongate slots designed to receive bolts 35 or the like, by means of which the motor carriage may be held in adjusted position lengthwise of the member 21. A motor M, for instance a gasoline engine, is mounted on the carriage 34, and by means of any suitable connections drives a vertical shaft 36 extending down through an opening in the top member 21 of the sled into the space between the top and bottom members 21 and 22. At its lower end the shaft 36 carries a pulley 37.

A pulley 38, of larger diameter than the pulley 37, is arranged within the space between the members 21 and 22 to turn about an axis parallel to that of the pulley 37, and a belt B embraces the two pulleys, whereby the pulley 38 is driven by the pulley 37 but at a lesser angular velocity. The pulley 38 is provided with a hub 39 (Fig. 3) having portions 40 and 41 of reduced diameter at its opposite ends, these portions 40 and 41 being received in the inner races of ball bearings 42 and 43, which respectively are secured, as by a press fit, in openings in parts 44 and 45 which are bolted to the top and bottom members 21 and 22 of the sled structure. A vertical shaft 46 extends through the bore of the pulley hub 39 and is splined to the latter, the shaft 46 having the keyway 47 which receives a key 48 (Fig. 5), preferably provided at its upper and lower ends with offset portions 49 and 50 which seat in slots in the opposite ends of the hub 39 of the pulley. Obviously, any conventional, functional equivalent may be substituted for the key and keyway. These offset portions 49 and 50 are provided with holes 51 to receive screws by means of which the key may be securely attached to the hub 39, so that the key cannot readily be lost.

The inner race of a ball bearing is attached by a press fit to the upper end of the shaft 46, while the outer race of this ball bearing is secured to a hand wheel 52 which is thus capable of turning, freely relatively to the shaft 46, but which forms a convenient handle by means of which the shaft may be moved vertically relatively to the hub 39 of the pulley 38.

Figure 8:
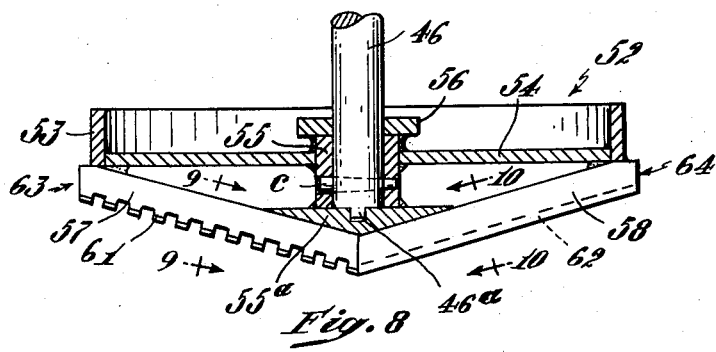
Fig. 8 is a vertical section on the line 8—8 of Fig. 7.
Figures 9, 10:
Fig. 9 is a section, to larger scale, substantially on the line 9—9 of Fig. 8.
Fig. 10 is a section, to larger scale, on the line 10—10 of Fig. 8.

At its lower end the shaft is fixed to an ice boring tool 52 (Figs. 2 and 8). This boring tool comprises the cylindrical guide ring 53 which is secured by means of arms 54 to a tubular hub member 55. Desirably the arms 54 are welded to the ring and to the hub member. Preferably a washer or annulus 56 of a diameter exceeding that of the hub 55 is welded to the upper end of the latter, this member 56 providing convenient means for engagement by a hook or latch device (not shown) for holding the boring tool in elevated position when desired.

The boring tool comprises a plurality of pairs of cutting blades. As here shown, two pairs of blades are provided. The blades 57 of one pair are disposed in the same vertical plane and fixed to the ring 53, and desirably to arms 54, by welding, and extending downwardly in converging relation so as to meet at a point coaxial with the shaft 46 where they are welded together, these blades preferably inclining downwardly at an angle of the order of 15° to the horizontal, although a lesser or greater angle may be employed. Each of the blades 57 (these blades being in the same vertical plane) is provided at its cutting edge with a series of spaced cutters 61, each having a beveled cutting edge. These blades 57, with their spaced cutting elements, are operative, when the boring tool is rotated, to form a cavity in the ice. The wall of the cavity, as produced by the blades 57 alone, would be distinguished by having a series of grooves with interposed ribs extending circumferentially of the cavity.

The blades 58 of the other pair, which lie in a plane perpendicular to that of the blades 57, and which converge downwardly at the same angle as blades 57 and which are rigidly joined to each other and to blades 57 at their lower ends are furnished with straight or uninterrupted cutting edges 62, also beveled, which are operative, as the tool is rotated, to shave off the ribs formed by the cutters 61 of blades 57. This arrangement provides for a much more rapid and efficient cutting or drilling operation than is obtainable by the use of blades, all of which have straight or smooth cutting edges like blades 58, or all of which have spaced or interrupted edges like those of blades 57.

It will be noted that the blades 57 and also the blades 58 project outwardly to a slight extent, as indicated at 63 and 64 respectively, beyond the peripheral surface of the guide ring 53. Thus the maximum diameter of the hole which is drilled by the use of this tool slightly exceeds the diameter of the guide 53, so that the latter does not bind on the wall of the bore hole. However, this circular, uninterrupted guide member 53 effectively prevents the tool from swinging sidewise and binding, even though the tool, in performing the boring operation in thick ice, may be disposed a long distance below the upper surface of the ice, and although under such conditions the shaft 46 is only supported at a substantial distance above the tool.

The hub 55 of the boring tool comprises a bottom element 55a having a transverse slot which receives a key 46a at the lower end of shaft 46, whereby turning force is transmitted from the shaft to the tool. A removable cotter pin C normally holds the tool assembled with the shaft, but may be removed to facilitate sharpening of the cutter blades.

In operation, the sled is moved to the place where the hole is to be cut, and then, after starting the motor, the operator seizes the wheel or handle 52 and pushes the shaft 46 downwardly, thus bringing the lower end of the tool into contact with the ice. As the tool revolves, it rapidly drills a hole into the ice. After the hole has reached a certain depth, the tool may be withdrawn from the hole, by lifting up on the handle 52, thus raising the tool above the ice, but to a position below the bottom member 22 of the sled, and in this position the continued rotation of the tool empties the tool of ice chips by centrifugal action. The tool is then moved downwardly again into the partially formed hole and the operation repeated until the hole extends all of the way through the ice.

The tool is then retracted completely and the sled moved to another position, where another hole may be drilled in the same way.

While one desirable embodiment of the invention has been disclosed herein by way of example, it is to be understood that the invention is broadly inclusive of any and all modifications falling within the scope of the appended claim.

I claim:

Apparatus for use in cutting holes in ice comprising in combination with a vertical rotary shaft which turns in bearings and which is of a length to extend downwardly through ice of a thickness of at least three feet, a boring tool comprising a tubular hub member having an axial bore in which the lower end portion of the shaft is removably fitted, a key which constrains the hub to turn with the shaft, a plurality of pairs of radial arms welded at their inner ends to the hub, a cylindrical guide ring, of an axial length approximating that of the hub, coaxial with the shaft and welded to the outer ends of the several arms, the arms being symmetrically spaced about the axis of the hub and substantially perpendicular to said axis, and a pair of cutter blades corresponding to each pair of arms, each blade being a rigid bar, substantially rectangular in transverse section and of greater depth than thickness, welded at its outer end to the lower edge of the guide ring and having its inner end welded to the hub, the lower edge of each blade being beveled to form a cutting element, the edge of one blade of each pair being straight and uninterrupted and the other blade of the same pair having its lower edge notched to form a series of spaced cutters, the cutting edge of each blade extending beyond the outer surface of the guide ring, and the cutting edges of the several blades converging downwardly to meet at a point in line with the axis of the hub, said cutting edges being inclined approximately 15° to the horizontal.

References Cited in the file of this patent

UNITED STATES PATENTS

| | | |
|---|---|---|
| 24,682 | Wertz | July 5, 1859 |
| 51,376 | Williams et al. | Dec. 5, 1865 |
| 149,717 | Burt | Apr. 14, 1874 |
| 390,749 | Burdick | Oct. 9, 1888 |
| 1,465,463 | De Lotto | Apr. 21, 1923 |
| 1,526,165 | McKee | Feb. 10, 1925 |
| 1,532,243 | Hebsacker | Apr. 7, 1925 |
| 1,731,872 | Schons | Oct. 15, 1929 |
| 2,107,958 | Pribyl | Feb. 8, 1938 |
| 2,393,282 | Berlin | Jan. 22, 1946 |
| 2,692,757 | Folstad | Oct. 26, 1954 |
| 2,742,750 | Funk | Apr. 24, 1956 |
| 2,766,014 | Hanson | Oct. 9, 1956 |